Figure 7:
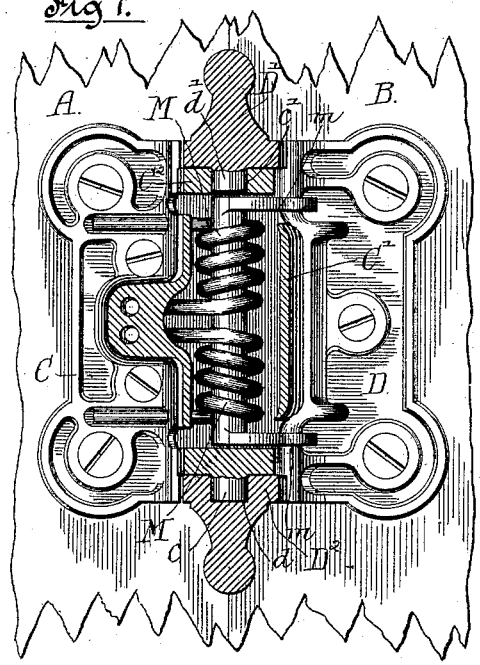

(Model.)
G. W. WARNER.
SPRING HINGE.
No. 448,390. Patented Mar. 17, 1891.
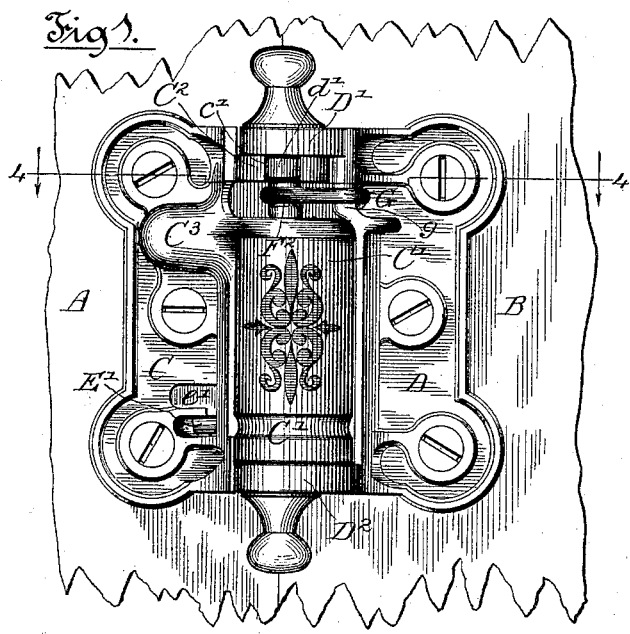
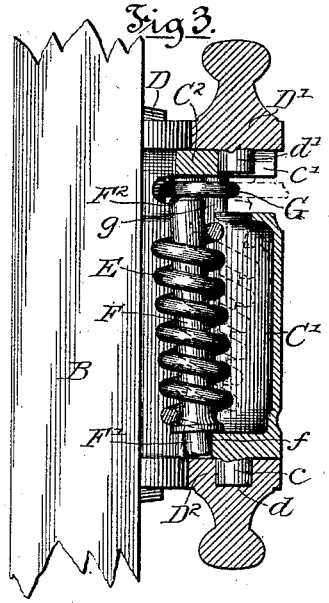
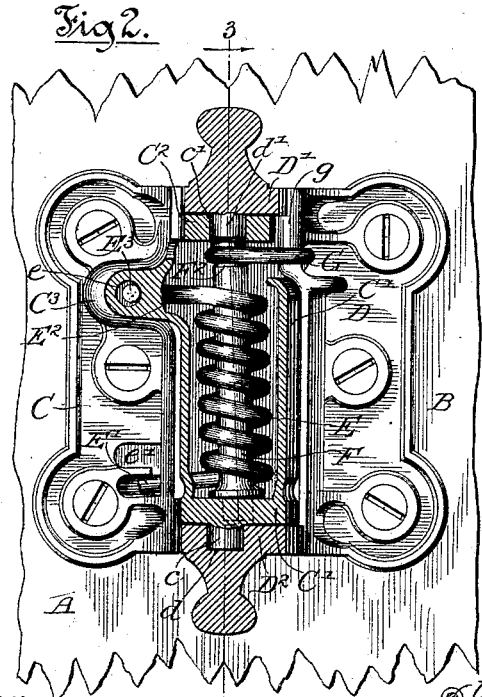
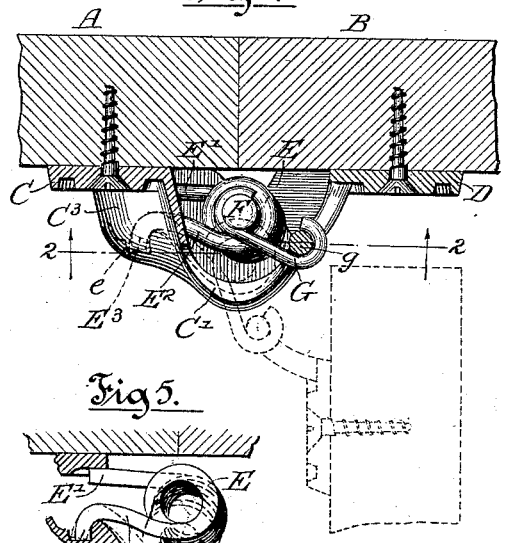
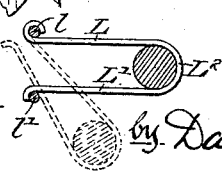
Witnesses
Wm. F. Henning
Louis M. F. Whitehead
Inventor
George W. Warner
by Dayton, Poole & Brown.
Attorneys.

(Model.) 2 Sheets—Sheet 2.

G. W. WARNER.
SPRING HINGE.

No. 448,390. Patented Mar. 17, 1891.

Witnesses
Wm. J. Heming
Louis M. F. Whitehead

Inventor
George W. Warner
by Dayton, Poole & Brown
Attorneys.

UNITED STATES PATENT OFFICE.

GEORGE W. WARNER, OF FREEPORT, ILLINOIS.

SPRING-HINGE.

SPECIFICATION forming part of Letters Patent No. 448,390, dated March 17, 1891.

Application filed November 17, 1890. Serial No. 371,708. (Model.)

*To all whom it may concern:*

Be it known that I, GEORGE W. WARNER, of Freeport, in the county of Stephenson and State of Illinois, have invented certain new and useful Improvements in Spring-Hinges; and I do hereby declare that the following is a full, clear, and exact description thereof, reference being had to the accompanying drawings, and to the letters of reference marked thereon, which form a part of this specification.

This invention relates to new and useful improvements in the construction of spring-hinges; and it consists in the matters hereinafter described, and pointed out in the appended claims.

In the accompanying drawings, illustrating my invention, Figure 1 is a front elevation of a spring-hinge embodying my invention. Fig. 2 is a similar view, partly in section, illustrating the arrangement of the spring. Fig. 3 is a vertical section on line 3 3 of Fig. 2. Fig. 4 is a horizontal cross-section on line 4 4 of Fig. 1. Fig. 5 is a view illustrating the operation of the spring. Fig. 6 is a view of a modification. Figs. 7, 8, 9, and 10 are views of other modified forms of my improved hinge.

In said drawings, A indicates the door-casing; B, the door; C, the leaf of the spring-hinge, which is attached to the casing, and D the leaf of the spring-hinge which is attached to the door.

The leaf C is formed with a cylindric housing or barrel $C'$, extending laterally, as shown in the drawings, so as to occupy a central position over the dividing-line between the door and the door-casing.

The leaf D of the hinge is provided with projecting lugs or ears $D'$ and $D^2$, which extend laterally adjacent to the ends of the cylindrical housing or barrel $C'$ upon the leaf C. Upon one end of the barrel $C'$ is conveniently formed a stud $c$, which engages with a socket $d$ in the ear $D^2$ and forms a pivotal connection between the said ear $D^2$ and one end of the leaf C. At the other end of the leaf C is formed a lug or ear $C^2$, which is preferably located adjacent to the ear $D'$, as shown in the drawings, and is provided with a notch $c'$, which engages a stud $d'$ upon the ear $D'$ of the leaf D, thus forming a pivotal connection between the ear $D'$ and the other end of the leaf C.

E indicates the spring, coiled spirally around and mounted upon the spindle F. This spindle terminates at one of its ends in a stud $F'$, which engages a recess $f$ in the closed end of the barrel or housing C. At its other end the spindle F is provided with an annular groove $F^2$.

G is a link which connects the end of the spindle F with the leaf D. The link G is provided with hooked ends, one of which passes over and around the upraised bar or pin $g$ on the leaf D.

The spring E is arranged upon the spindle F and within the barrel $C'$, so that its ends $E'$ and $E^2$ both bear upon the leaf C of the hinge, in which position the ends $E'$ and $E^2$ will obviously exert pressure in opposite directions upon the leaf C. In order to utilize the expansive force of the spring, one end $E'$ is arranged to bear upon the leaf C, as shown in Figs. 1, 2, and 5 of the drawings, exerting a pressure toward the door-casing, while the other end $E^2$ is secured within a housing $C^3$ to bear outwardly or away from the door-casing.

As clearly shown in Figs. 3, 4, and 5 of the drawings, the end $E'$ of the spring bearing toward the door-casing tends to throw the lower end of the spindle outward or away from said casing, while the end $E^2$ of the spring bearing outwardly tends to throw the upper end of the spindle inwardly or toward the casing. The link or hook G, although a movable bearing for this upper end of the spindle, limits its movement toward the door-casing.

The spindle F is, as shown more particularly in Fig. 3, arranged eccentrically to the pivotal connections between the leaves C and D of the hinge, and the bearing $g$ for the link G, which supports the upper end of the spindle, being formed upon one of the leaves of the hinge, necessarily describes an arc concentric with the pivotal connection between the leaves C and D as the door is opened and closed. As shown more particularly in Figs. 3, 4, and 5 of the drawings, this motion of the leaf D about the pivotal connection with the leaf C moves the upper or movable end of the spindle F away from the door-casing as the door is opened, and, as shown more particularly in Figs. 4 and 5 by dotted lines, this movement of the end of the spindle compresses the spring, inasmuch as the two ends of the spring are secured within immovable bearings.

It is obvious that when the door is released the tension caused by the compression of the spring, as before described, will tend to return the parts of the hinge to their initial position. Furthermore, it will be noted that in case the door is opened beyond the position in which the stud F' and bearing $g$ are in line the bearing $g$ for the link G will gradually approach the door-casing and the spring will be returned to its initial position and will serve to hold the door in its opened position in the same manner. This construction therefore tends to hold the door closed when the door is closed and tends to hold the door open when the door is opened.

In order to prevent the end $E^2$ of the spring being drawn out of the housing $C^3$ as the upper end of the spring is moved outward, I find it convenient to form a hook $E^3$ thereon, and to engage said hook $E^3$ in a recess $e$ within the housing $C^3$, as illustrated more clearly in Figs. 2 and 4.

To facilitate the assembling of the various parts I find it convenient to form a small opening or slot $e'$ in the leaf C adjacent to the bearing for the end $E'$ of the spring. By this means the parts may all be put together in their proper relative positions, the spring being slipped upon the spindle F, and the end $E^2$ engaged within the housing $C^3$ without any pressure being exerted by the spring, and after the parts have all been adjusted into their proper positions the free end $E'$ of the spring E may be easily forced through the opening $e'$ and engaged with the bearing upon the leaf C adjacent thereto, the spring being then in position for operation.

It is obvious that the exact form of construction herein shown and described may be modified without departure from my original invention—for instance, as shown in Fig. 6, the spring may be formed in a substantially U shape, there being no intermediate coils, and the bearings $l\ l'$ for the arms L L' of the spring arranged in substantially the same manner as in the form hereinbefore described, the central or curved part of the spring $L^2$ being arranged to bear upon a movable spindle. In this form of construction a flat leaf or plate spring may be employed, if desired.

In the form of hinge shown in Fig. 7 the spring is made in two parts M M, each bearing at both ends upon one of the leaves of the hinge, and both ends of the spindle being connected by links $m\ m$ with the other leaf. In this form of spring the spindle moves bodily, and both springs are equally compressed in the operation of the hinge.

Figure 8:
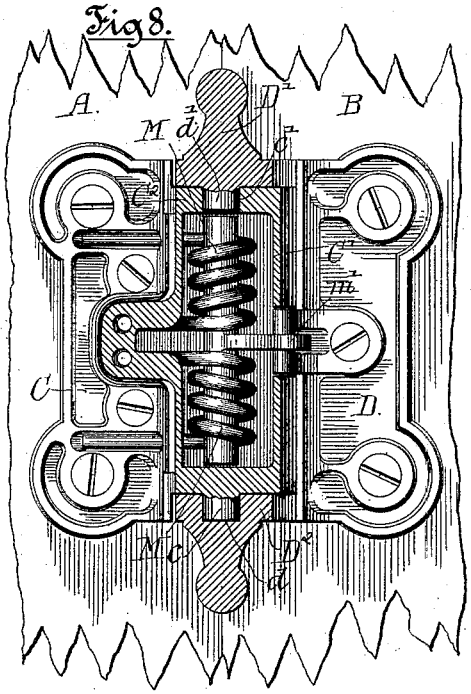

In the form shown in Fig. 8 the springs are arranged in the same manner as in Fig. 7, but the spindle is connected with the other leaf of the hinge by a single link $m'$ in the center and its ends are left free. In both these forms of construction the links are preferably made integral with the spindle.

Figure 9:
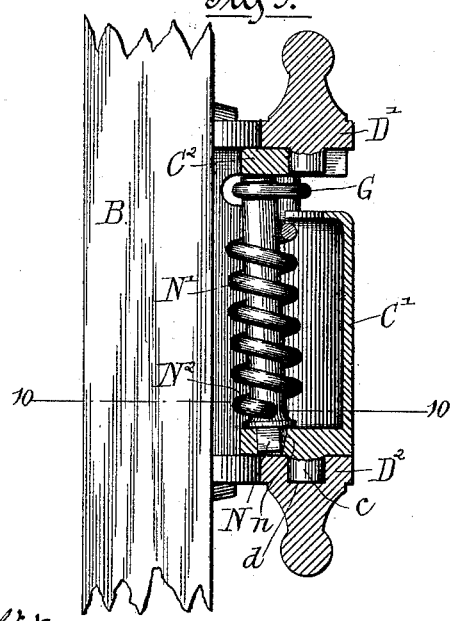
Figure 10:
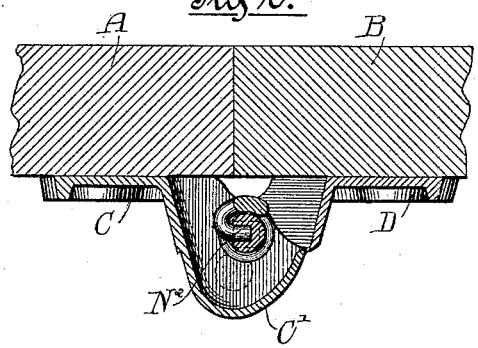

In the form shown in Figs. 9 and 10 the spindle is made with a square projection N upon its lower end, which engages a correspondingly-shaped recess $n$ in the barrel of the hinge, and is thereby held from rotation, while being also free to move laterally at its upper end. In this form of construction the spring N' is secured to the spindle at one end, and its other end is arranged to bear upon the leaf of the hinge, as before described. In this form the spring is preferably bent at its lower end, as indicated at $N^2$, and the bent extremity engaged with an orifice in the spindle.

Various other modifications may be made in details of construction without departure from my invention.

Having described my invention, what I claim is—

1. A spring-hinge comprising two leaves pivotally connected together and a spring provided with two arms bearing in opposite directions upon one of said leaves and having an intermediate curved or coiled portion engaged with a movable bearing upon the other leaf, substantially as described.

2. A spring-hinge comprising two leaves pivotally connected together, a spindle having a bearing at one end in one of said leaves and being movably connected at its other end to the other leaf, a spring having two projecting arms arranged to bear in opposite directions upon one of said leaves, and an intermediate coiled or bent portion bearing upon said spindle, said spindle being located eccentrically to the pivotal connection between the leaves, substantially as described.

3. The herein-described spring-hinge, comprising two leaves pivotally connected together, a spindle having a bearing upon one of said leaves eccentric to said pivotal connection, a hook or link secured to the other leaf of the hinge at one end and to the free end of the spindle at its other end, and a spring provided with two arms arranged to bear in opposite directions upon the first-mentioned leaf and having an intermediate curved or coiled portion engaged with said spindle, substantially as described 4. The herein-described spring-hinge, comprising two leaves pivotally connected together, one of said leaves being provided with a barrel or housing for the spring, a spindle having a bearing at one end within said barrel or housing and eccentric to the connection between the leaves, a link connected with the other leaf and with the free end of said spindle, and a spring having a spirally-coiled body engaged with said spindle and provided with two arms arranged to bear in opposite directions upon the first-mentioned leaf, substantially as described.

5. The herein-described spring-hinge, comprising two leaves pivotally connected together, one of said leaves being provided with a barrel or housing for the spring, a spindle having a bearing at one end within said barrel or housing and eccentric to the connection between the leaves, a link connected with the other leaf and with the free end of said spindle, and a spring having a spirally-coiled body engaged with said spindle and provided with two arms arranged to bear in opposite directions upon the first-mentioned leaf, and a slot or opening formed in said leaf adjacent to one of said bearings, substantially as described.

In testimony that I claim the foregoing as my invention I affix my signature in presence of two witnesses.

GEORGE W. WARNER.

Witnesses:
B. F. BLACK,
T. R. BARTLETT.